(12) United States Patent
Gregersen et al.

(10) Patent No.: US 11,053,915 B2
(45) Date of Patent: Jul. 6, 2021

(54) DISTRIBUTED DATA ANALYSIS SYSTEM FOR WIND POWER PLANTS BACKGROUND

(71) Applicant: VESTAS WIND SYSTEMS A/S, Aarhus N (DK)

(72) Inventors: Anders Rhod Gregersen, Gistrup (DK); Jan Krogh Jensen, Hinnerup (DK); Mehran Nourbakhsh, Lystrup (DK); Morten Tim Thorsen, Tilst (DK); Martin Qvist, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 28 days.

(21) Appl. No.: 16/472,939

(22) PCT Filed: Nov. 24, 2017

(86) PCT No.: PCT/DK2017/050392
§ 371 (c)(1),
(2) Date: Jun. 24, 2019

(87) PCT Pub. No.: WO2018/113864
PCT Pub. Date: Jun. 28, 2018

(65) Prior Publication Data
US 2020/0095979 A1 Mar. 26, 2020

(30) Foreign Application Priority Data
Dec. 22, 2016 (DK) .............................. PA201671024

(51) Int. Cl.
*F03D 7/00* (2006.01)
*F03D 17/00* (2016.01)
*G05B 13/02* (2006.01)

(52) U.S. Cl.
CPC ............... *F03D 7/00* (2013.01); *F03D 17/00* (2016.05); *G05B 13/024* (2013.01)

(58) Field of Classification Search
CPC .......... F03D 7/00; F03D 17/00; G05B 13/024
See application file for complete search history.

(56) References Cited

U.S. PATENT DOCUMENTS 10,050,447 B2 * 8/2018 Burra ..................... H02J 3/48
2004/0230377 A1 * 11/2004 Ghosh .................... F03D 7/043
702/3
(Continued)

FOREIGN PATENT DOCUMENTS

| EP | 2607690 A1 | 6/2013 |
| EP | 3012449 A1 | 4/2016 |

(Continued)

OTHER PUBLICATIONS

Danish Patent and Trademark Office 1st Technical Examination of Application No. PA 2016 71024 dated May 17, 2017.
(Continued)

*Primary Examiner* — Vincent H Tran
(74) *Attorney, Agent, or Firm* — Patterson + Sheridan, LLP

(57) ABSTRACT

A method, controller, wind turbine, and computer program product are disclosed for processing and analyzing wind turbine operational data in a distributed data analysis system. An example method generally includes obtaining, at a first data analysis system, operational data from a plurality of wind turbines in a first wind power plant, determining adjustments to wind turbine operational parameters based on the operational data, pushing the adjustments to the first wind power plant, transmitting the operational data to a second data analysis system not located at the first wind power plant, and transmitting the operational data from the first wind power plant and at least a second wind power plant to a third data analysis system, wherein the third data analysis system comprises a global data analysis system.

17 Claims, 5 Drawing Sheets

(56) References Cited

U.S. PATENT DOCUMENTS

| | | | |
|---|---|---|---|
| 2005/0090937 A1* | 4/2005 | Moore | F03D 7/048 |
| | | | 700/286 |
| 2009/0281675 A1* | 11/2009 | Rasmussen | F03D 7/047 |
| | | | 700/287 |
| 2013/0272844 A1* | 10/2013 | Lobato Pena | H02J 3/381 |
| | | | 415/1 |
| 2013/0300115 A1 | 11/2013 | Seem et al. | |
| 2014/0228976 A1* | 8/2014 | K. S. | G06F 21/604 |
| | | | 700/9 |
| 2016/0049792 A1 | 2/2016 | Burra et al. | |
| 2017/0328344 A1* | 11/2017 | Erbacher | F03D 7/047 |
| 2017/0350369 A1* | 12/2017 | Evans | F03D 7/0224 |
| 2017/0350370 A1* | 12/2017 | Son | G06Q 10/087 |
| 2018/0067738 A1* | 3/2018 | Noto | H04L 43/16 |

FOREIGN PATENT DOCUMENTS

| | | | |
|---|---|---|---|
| WO | 2008086801 A2 | 7/2008 | |
| WO | 2009016020 A1 | 2/2009 | |
| WO | 2014153673 A1 | 10/2014 | |
| WO | 2014202085 A1 | 12/2014 | |
| WO | 2018113864 A2 | 6/2018 | |

OTHER PUBLICATIONS

PCT Notification of Transmittak of the International Search Report and the Written Opinion of the International Searching Authority, or the Declaration for Patent Application PCT/DK2017/050392 dated Jul. 8, 2018.

* cited by examiner

DISTRIBUTED DATA ANALYSIS SYSTEM FOR WIND POWER PLANTS BACKGROUND

BACKGROUND

Field of the Invention

Embodiments presented in this disclosure generally relate to techniques for analyzing wind turbine data from one or more wind power plants and determining operational parameter adjustments to be performed across wind power plants based on the analyzed data.

Description of the Related Art

Wind turbines generally include a variety of sensors that are used to monitor operating parameters of a wind turbine. These sensors generally gather data about turbine components (e.g., turbine rotational speed, system temperature, blade pitch and yaw, power output), the turbine electrical system, weather data (e.g., wind speed and direction), and so on. To allow a technician to monitor and control a wind turbine, the wind turbine generally provides data to a supervisory data acquisition and control (SCADA) system via a network connection. The SCADA system generally provides systems for monitoring and processing data received from a wind turbine. The SCADA system can display operations data for the wind turbines in a wind farm, for example, by requesting data from one or more wind turbines according to a pre-configured interval for each of the sensors and/or turbine data points that are to be monitored. Additionally, SCADA systems allow a technician to control a wind turbine by providing control signals to modify operating parameters (e.g., maximum rotational speed, temperature settings, and so on).

SCADA systems are generally local to a single wind power plant and perform data analysis and parameter adjustment for the wind turbines in the wind power plant monitored by a SCADA system. Because SCADA systems generally gather operational data from wind turbines at a local wind power plant but may not be able to gather operational data from wind turbines at other wind power plants (even if the wind power plants are operated by the same operator), the data analysis and operational parameter adjustments performed by the SCADA system may not take into account conditions experienced by similar models of wind turbines across power plants. Additionally, the locality of data analysis and parameter adjustment to the wind power plant monitored by a SCADA system may not allow for a manufacturer of wind turbines to aggregate operational data from various operators for use in recommending changes to operational parameters to wind turbines installed by the various operators.

SUMMARY

Embodiments of the present disclosure process wind turbine data in a distributed data analysis system. As discussed herein, the distributed data analysis system may be divided into a hierarchy of "zones" in which data analysis systems operate. A wind power plant zone generally encompasses a single wind power plant and may be the location at which wind turbine data is initially gathered. A wind power plant comprises a plurality of wind turbines and is also known as a wind park or a wind farm. Regional zones may be positioned above wind power plant zones in the hierarchy of zones and may obtain data from multiple wind power plant zones (e.g., wind power plants) for analysis. A regional zone may be established, for example, on a per-operator basis or on a geographical basis (e.g., a regional zone for wind power plants in a given state, province, or country). A central zone generally is positioned above regional zones in the hierarchy and may receive wind turbine data from multiple wind power plants through one or more connected regional zones. A central zone may be, for example, established by a wind turbine manufacturer to obtain and analyze data from wind power plants within a given country or across groups of countries.

One embodiment of the present disclosure is a method for processing wind turbine data in a distributed data analysis system. The method generally includes obtaining, at a first data analysis system operational data from a plurality of wind turbines in a first wind power plant. The first data analysis system determines one or more adjustments to perform to operational parameters of one or more of the wind turbines based on the operational data and pushes the one or more adjustments to the first wind power plant. The first data analysis system further transmits the operational data to a second data analysis system, wherein the first data analysis system is located at the first wind power plant and the second data analysis system comprises a regional data analysis system not located at the first wind power plant. The second data analysis system transmits the operational data from the first wind power plant and operational data from at least a second wind power plant to a third data analysis system, wherein the third data analysis system comprises a central data analysis system.

The method advantageously allows for the distribution of data analysis and operational parameter adjustment across wind power plants owned by the same or different operators. Bulk sensor data and other operational information may be obtained from wind turbines using a data acquisition system local to each wind power plant and forwarded to a data acquisition system in another data analysis zone (e.g., a regional or operator-specific data analysis zone). The data acquisition systems installed in a regional or operator-specific data analysis zone can analyze data received from multiple wind power plants (e.g., on a per-wind turbine model basis) and identify, based on the received data, operational parameter changes to recommend to various operators of a specific model of wind turbine. By pushing data from more local data acquisition systems to more geographically diverse data acquisition systems, a wind power plant operator can obtain data analysis and changes to operational parameters for wind turbines based on conditions experienced across a larger fleet of wind turbines and, in some cases, across different operators of the same model of wind turbine.

Another embodiment of the present disclosure is a computer program product comprising a computer-readable device having computer-readable program code embodied therewith, the computer-readable program code configured to perform an operation for processing wind turbine data in a distributed data analysis system. The operation generally includes obtaining, at a first data analysis system operational data from a plurality of wind turbines in a first wind power plant. The first data analysis system determines one or more adjustments to perform to operational parameters of one or more of the wind turbines based on the operational data and pushes the one or more adjustments to the first wind power plant. The first data analysis system further transmits the operational data to a second data analysis system, wherein the first data analysis system is located at the first wind power plant and the second data analysis system comprises a regional data analysis system not located at the first wind power plant. The second data analysis system transmits the operational data from the first wind power plant and operational data from at least a second wind power plant to a third data analysis system, wherein the third data analysis system comprises a central data analysis system The computer program product advantageously allows for the distribution of data analysis and operational parameter adjustment across wind power plants owned by the same or different operators. Bulk sensor data and other operational information may be obtained from wind turbines using a data acquisition system local to each wind power plant and forwarded to a data acquisition system in another data analysis zone (e.g., a regional or operator-specific data analysis zone). The data acquisition system installed in a regional or operator-specific data analysis zone can analyze data received from multiple wind power plants (e.g., on a per-wind turbine model basis) and identify, based on the received data, operational parameter changes to recommend to various operators of a specific model of wind turbine. By pushing data from more local data acquisition systems to more geographically diverse data acquisition systems, a wind power plant operator can obtain data analysis and changes to operational parameters for wind turbines based on conditions experienced across a larger fleet of wind turbines and, in some cases, across different operators of the same model of wind turbine.

Another embodiment of the present disclosure is a system comprising a processor and memory having instructions thereon configured to perform an operation for processing wind turbine data in a distributed data analysis system. The operation generally includes obtaining, at a first data analysis system operational data from a plurality of wind turbines in a first wind power plant. The first data analysis system determines one or more adjustments to perform to operational parameters of one or more of the wind turbines based on the operational data and pushes the one or more adjustments to the first wind power plant. The first data analysis system further transmits the operational data to a second data analysis system, wherein the first data analysis system is located at the first wind power plant and the second data analysis system comprises a regional data analysis system not located at the first wind power plant. The second data analysis system transmits the operational data from the first wind power plant and operational data from at least a second wind power plant to a third data analysis system, wherein the third data analysis system comprises a central data analysis system.

The system advantageously allows for the distribution of data analysis and operational parameter adjustment across wind power plants owned by the same or different operators. Bulk sensor data and other operational information may be obtained from wind turbines using a data acquisition system local to each wind power plant and forwarded to a data acquisition system in another data analysis zone (e.g., a regional or operator-specific data analysis zone). The data acquisition systems installed in a regional or operator-specific data analysis zone can analyze data received from multiple wind power plants (e.g., on a per-wind turbine model basis) and identify, based on the received data, operational parameter changes to recommend to various operators of a specific model of wind turbine. By pushing data from more local data acquisition systems to more geographically diverse data acquisition systems, a wind power plant operator can obtain data analysis and changes to operational parameters for wind turbines based on conditions experienced across a larger fleet of wind turbines and, in some cases, across different operators of the same model of wind turbine.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Figure 1:
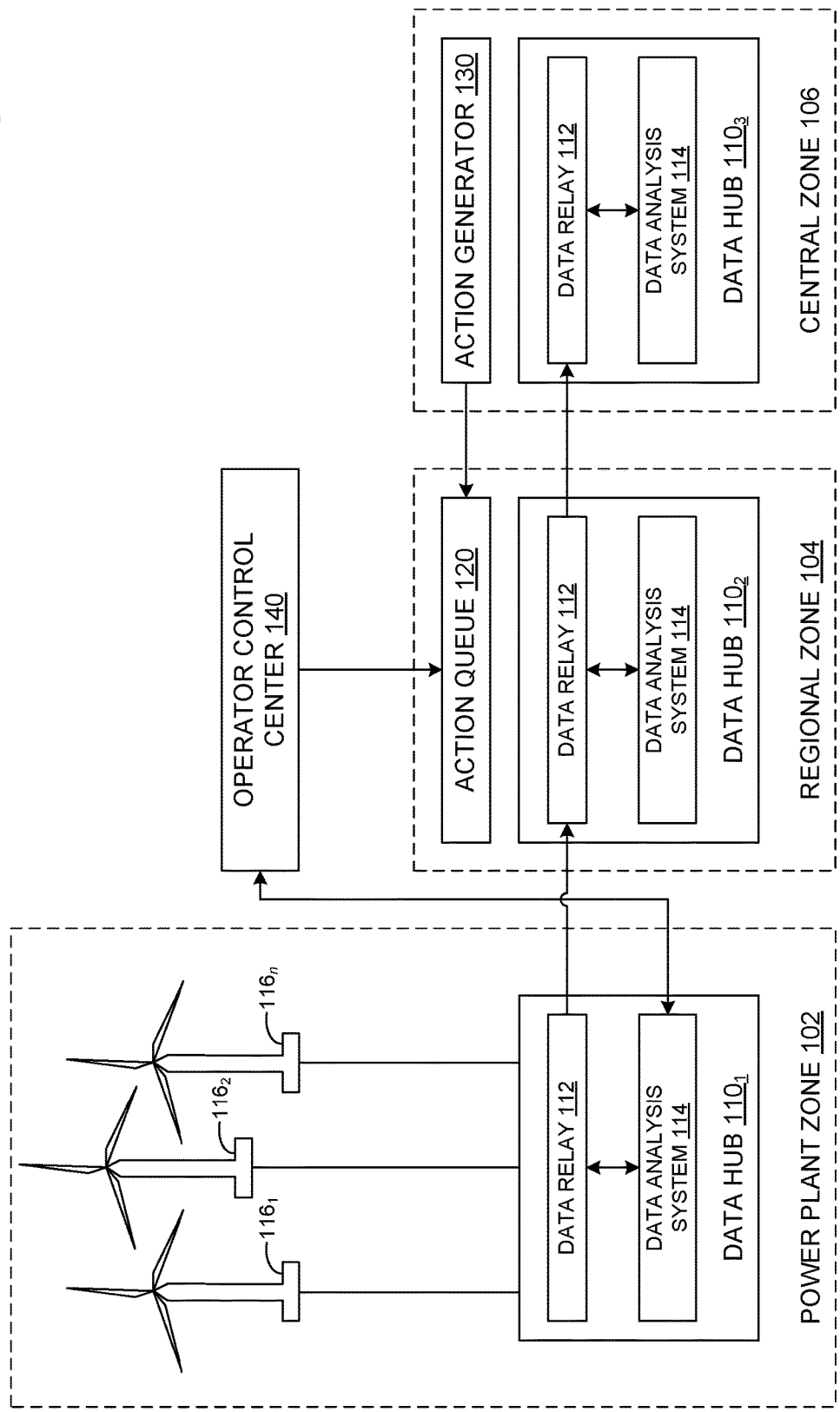
FIG. 1 illustrates an example distributed data acquisition and control system, according to an embodiment of the present disclosure.

Embodiments presented herein provide techniques for collecting data from wind turbines in multiple wind power plants and generating adjustments to wind turbine operational parameters based on the data collected from multiple wind power plants. As discussed herein, data acquisition and control of wind turbines and/or wind power plants may be performed in a distributed data analysis system which may be structured into multiple zones in which data hubs may be deployed. Data hubs may be implemented at the wind power plant (which may be referred to as a wind power plant zone) and in multiple zones encompassing multiple wind power plants (e.g., regional zones which may be manufacturer-specific zones or linked to a specific geographic region) and central zones (which may be maintained by a wind turbine manufacturer to manage wind turbine installations across geographical regions and operators). The data hubs installed at a wind power plant receive data from one or more wind turbines in the wind power plant (by periodically requesting sensor data from one or more wind turbines or asynchronously receiving data from one or more wind turbines in the wind power plant) and perform a power plant-specific analysis of the data. The power plant-specific data analysis may allow for the wind power plant data hub to adjust, in real time (or close to real time) operational parameters for one or more wind turbines in the power plant. The wind power plant data hubs can also establish connections with and forward the gathered sensor data to one or more regional data hubs. The regional data hubs can aggregate sensor data from wind turbines in multiple wind power plants to identify, for example, operational trends and adjustments to be performed on wind turbines monitored by the connected wind power plant data hubs. In some cases, the regional data hubs can recommend operational parameter adjustments on a per-turbine model basis, and in some cases, the operational parameter adjustments may be forwarded to a customer-facing control center. At the customer-facing control center, a wind power plant manager can view the recommended adjustments and determine whether or not to apply the recommended operational parameters to one or more wind turbines in the wind power plant.

By implementing a hierarchical data hub model for collecting data from wind turbines and analyzing the collected data, a distributed data acquisition system can leverage operational information gathered from multiple wind power plants to optimize the performance of wind turbines across different operators and different wind power plant sites. Doing so allows for regional data analysis systems to obtain data from wind power plants without generating periodic requests for wind turbine data from multiple wind power plants, as data is generally gathered at a data hub local to each wind power plant and forwarded to regional data analysis systems. Additionally, operators can leverage operational data gathered across the wind power plants owned by the operator to optimize performance of wind power plants, and manufacturers of wind turbines can leverage operational data gathered from different installations to recommend adjustments to operational parameters (or generate updated default parameters) that can be applied as a "base" parameter set to wind turbines operated by different operators.

FIG. 1 illustrates an example zone-based data hub architecture for data acquisition and control of wind turbines and/or wind power plants, according to an embodiment. As illustrated, zone-based data hub architecture 100 includes a power plant zone 102, a regional data analysis zone 104, and a central data analysis zone 106. As discussed herein, a regional analysis zone 104 may encompass a geographic area or may encompass wind power plants operated by a particular operator. Central data analysis zone 106 may, in some cases, be implemented to allow manufacturers of wind turbines to obtain data from various wind turbine installations (e.g., from data forwarded to a data hub $110_3$ in central data analysis zone 106 from a data hub $110_2$ in regional data analysis zone 104). In some cases, a wind turbine manufacturer may maintain multiple central data analysis zones 106, for example, based on legal requirements that may restrict the export of data outside of national borders.

Power plant zone 102 generally encompasses a wind power plant and an associated data hub $110_1$. As illustrated, power plant zone 102 includes data hub $110_1$ and one or more wind turbines 116. Each wind turbine 116 may be connected to data hub $110_1$ (e.g., via a wired network connection and/or a wireless connection). Each of the wind turbines 116 generally include a plurality of sensors that monitor various operating conditions within a wind turbine 116. For example, the sensors may include temperature sensors at various locations within a wind turbine 116, speed sensors used to monitor the rotational speed of various components within a wind turbine 116 (e.g., main shaft, gearbox components, and so on), vibration sensors, power production sensors, and so on. The sensors may generate real-time data that may be, for example, buffered at each wind turbine 116. In some cases, the sensors can generate raw data as voltage outputs that can be correlated to an actual data point (e.g., rotational speed in revolutions per minute, generated power in watts (or megawatts), component temperatures in degrees Celsius, and so on).

Data hub $110_1$, as illustrated, includes a data relay 112 and a data analysis system 114. Because data hub $110_1$ is located within power plant zone 102, data hub $110_1$ may be configured to request data from sensors at each wind turbine 116 in power plant zone 102 according, for example, to a schedule defined for each sensor installed in the wind turbine. For example, an internal rotational speed sensor for a gearbox in a wind turbine 116 may be pulled continuously or substantially continuously, while data from other sensors may be pulled with a lower periodicity. In some cases, data hub $110_1$ may receive data generated by a wind turbine 116 in response to events that occur irregularly. For example, a wind turbine 116 may generate data based on alarms or events that occur during wind turbine operations. An alarm may include, for example, gearbox overspeed or overheating events, and wind turbine 116 can, in some cases, buffer the generated alarms until data hub $110_1$ requests information about generated alarms according to a schedule for requesting alarm data from wind turbines 116 in the wind power plant. In response, the wind turbine 116 can transmit an indication of the alarm, a timestamp, and the conditions that generated the alarm to data hub $110_1$.

When data hub $110_1$ receives data from one or more wind turbines 116 in the wind power plant, data relay 112 generally forwards the data to data hubs in a regional zone 104 and/or central zone 106, according to a data forwarding configuration defined for data hub $110_1$. The data forwarding policy may, for example, indicate a specific regional zone 104 that data hub $110_1$ is to forward wind turbine operational data (or sensor data), such as a regional zone 104 associated with a specific wind power plant operator. In some cases, if data hub $110_1$ receives data from one or more wind turbines 116 as raw data (e.g., voltage data), data hub $110_1$ may convert the raw data to the actual data points before data relay 112 forwards the sensor data and/or other operational data to the data hubs in regional zone 104 and/or central zone 106.

Data analysis system 114 in data hub $110_1$ generally receives the data obtained from wind turbines 116 and commits the received data to a data store in which data hub $110_1$ saves historical data related to wind turbine operations at the wind power plant covered by power plant zone 102. Data analysis system 114 may save the data, for example, in a searchable data store (e.g., a database), and each saved data point may be associated with a source wind turbine 116 and a timestamp. In some cases, data analysis system 114 may host a historical data viewer that allows an operator to view historical wind power plant data. Data analysis system 114 can provide, for example, an overview screen that displays information about the health of wind turbines 116 in the wind power plant and instantaneous power generation readings for each wind turbine 116 in the wind power plant as well as additional screens that provide more granular details regarding the operating status of specific wind turbines 116 in the wind power plant. In some cases, data analysis system 114 may additionally include one or more data query screens that allow a technician to specify one or more operational data points gathered from wind turbines 116 in the wind power plant over a specified date range to view. The data analysis system 114 may allow a technician or wind power plant operator to view and print the data in a tabular format and generate plots of the retrieved operational data to identify operational trends for one or more wind turbines 116 in the wind power plant.

Based on the historical data, data analysis system 114 can generate, for example, reports indicating operational trends in the wind power plant. Data analysis system 114 can periodically generate reports of operational trends in the wind power plant according to a configuration defined for data hub $110_1$. Additionally, data analysis system 114 provides a platform for deploying a variety of data analysis applications on data hub $110_1$ to identify operational issues in a wind power plant and perform real-time monitoring of wind turbines 116 in the wind power plant. In some cases, data analysis system 114 may include performance forecasting applications that obtain historical weather and wind speed data for a given tie period at a given location. Using the historical data and forecasted weather and wind speed data, the performance forecasting applications can predict future performance of wind turbines 116 in the wind power plant and provide reports of the predicted performance to an operator of the wind power plant managed within power plant zone 102.

In some cases, one or more applications installed in data analysis system 114 can use historical performance data gathered from wind turbines 116 installed in a wind power plant to identify performance trends of wind turbines in the wind power plant. Based on the performance trends identified from the historical data, data analysis system 114 can identify adjustments to perform to operational parameters applied to one or more wind turbines 116 in the wind power plant managed within power plant zone 102 and apply the adjustments to the one or more wind turbines.

As illustrated, regional zone 104 may host a data hub $110_2$ and an action queue 120. Regional zone 104 may be, for example, be structured as an operator-specific management zone that receives data from multiple power plant zones 102 operated by the same operator. By receiving data from multiple power plant zones 102, an operator can identify performance trends of wind turbines in different wind power plants and generate, for example, adjustments to wind turbine operational parameters that can be applied across different wind power plants.

Data relay 112 in data hub $110_2$ is generally configured to receive data forwarded from one or more power plant zones 102 and commit the data to a historical data store. Data relay 112 additionally forwards the data received from the one or more power plant zones 102 to a data hub $110_3$ in a central zone 106, where, as discussed herein, wind turbine data from various operators may be aggregated and analyzed (e.g., by a manufacturer of the wind turbines) to identify and deploy recommended operational parameters across wind power plant operators. In some cases, data relay 112 in data hub $110_2$ may forward data to a data hub $110_3$ in a central zone 106 specified in a configuration file. The specified central zone may be selected, for example, based on restrictions on the export of technical data.

Data analysis system 114 in data hub $110_2$ commits the received data to a data store in which data hub $110_2$ saves historical data related to wind turbine operations at the one or more wind power plants that forward data to data hub $110_2$ in regional zone 104. Data analysis system 114 may save the received data, for example, in a searchable data store, and each data point received at data hub $110_2$ and saved in the data store may be associated with an identifier of the source wind power plant, the source wind turbine 116, and a timestamp. As discussed above with respect to data hub $110_1$, data analysis system 114 in data hub $110_2$ may host, in some cases, a historical data view that allows an operator to view historical wind power data. In some cases, because the historical wind power plant data saved in data hub $110_2$ may encompass data from multiple wind power plants, data analysis system 114 in data hub $110_2$ may allow a technician or operator to compare operational data trends across wind power plants. To generate a comparison, data analysis system 114 may generate one or more reports (in tabular or graphical form) and, for example, indicate outliers or deviations from operational performance trends experienced across multiple wind power plants.

In some cases, based on the historical data obtained from multiple wind power plants, data analysis system 114 in data hub $110_2$ can analyze the historical data and identify adjustments to perform to operational parameters applied to wind turbines in the one or more wind power plants that forward data to data hub $110_2$. Data analysis system 114 can, in some cases, automatically push adjusted operational parameters to one or more wind power plants to apply the adjusted operational parameters to one or more identified wind turbines (e.g., individual turbines, specific models of wind turbines, and so on). In some cases, data analysis system 114 can push the adjusted operational parameters to an action queue 120 in regional zone 104, where an operator can view the adjusted operational parameters (e.g., through a connection between action queue 120 and operator control center 140) and determine whether to apply the adjusted operational parameters to turbines in the wind power plants managed by the operator. Data analysis system 114 may additionally host additional applications that use and process the data obtained from wind power plants, for example, to perform power generation forecasting, predict when maintenance may need to be performed on wind turbines in a wind power plant, predict wind turbine downtime, and so on.

As illustrated, central zone 106 may host a data hub $110_3$ and an action generator 130. Central zone 106 may be, for example, be managed by a manufacturer of wind turbines and be structured as a management zone that receives data from multiple power plant zones 102 operated by a variety of operators. By receiving data from multiple power plant zones 102, a manufacturer can identify performance trends of wind turbines in different wind power plants and generate adjustments to wind turbine operational parameters to optimize the performance of wind turbines operated by a variety of operators in a variety of locations. In some cases, a manufacturer may maintain multiple central zones 106 according to, for example, restrictions on data locality (e.g., where or if technical data can be exported outside of national boundaries).

Data relay 112 in data hub $110_3$ is generally configured to receive data forwarded from data hubs in one or more regional zones 104 and commit the data to a historical data store. The data forwarded from data hubs in one or more regional zones 104 may include wind turbine operational data from multiple wind power plants operated by one or more operators.

Data analysis system 114 in data hub $110_3$ commits the received data to a data store in which data hub $110_3$ saves historical data related to wind turbine operations at wind power plants operated by a variety of operators. Data analysis system 114 may save the received data, for example, in a searchable data store, and each data point received at data hub $110_3$ and saved in the data store may be associated with an identifier of the source regional zone 104, the source wind power plant, the source wind turbine 116, and a timestamp. As discussed above with respect to data hubs $110_1$ and $110_2$, data analysis system 114 in data hub $110_3$ may host, in some cases, a historical data view that allows an operator to view historical wind power data. In some cases, because the historical wind power plant data saved in data hub $110_3$ may encompass data from multiple wind power plants operated by various operators, data analysis system 114 in data hub $110_2$ may allow a technician or operator to compare operational data trends across wind power plants (operated by the same or different operators) and/or across operators of wind power plants. To generate a comparison, data analysis system 114 may generate one or more reports (in tabular or graphical form) and, for example, indicate outliers or deviations from operational performance trends experienced across multiple wind power plants. These reports may include, for example, statistical analyses of operational data that can identify operational conditions at specific turbines or wind power plants that are outliers from operational conditions across multiple wind power plants (e.g., identifying, after controlling for weather and wind speed, power plants that are producing multiple standard deviations more or less power on a per-turbine basis than the average per-turbine generated power across multiple wind power plants).

Data analysis system 114 in data hub $110_3$ generally hosts a variety of applications that analyze the operational data received from one or more wind power plants (e.g., sensor data from wind turbines, weather information, and so on). In some cases, applications hosted on data analysis system 114 can analyze the historical data and identify adjustments to perform to operational parameters applied to wind turbines across different wind power plants operated by different operators. In some cases, data analysis system 114 in data hub $110_3$ can generate a recommended or "default" set of operational parameters to apply to different models of wind turbines and push the operational parameters to action generator 130 for transmission to action queue 120 in one or more regional zones 104, where, as discussed above, recommended adjustments to wind turbine operating parameters may be stored and made available for wind power plant operators to view and determine whether to apply the recommended adjustments to one or more wind turbines. In some cases, the applications hosted by data analysis system 114 in data hub $110_3$ may include forecasting tools that use and process the data obtained from wind power plants, for example, to perform power generation forecasting, predict when maintenance may need to be performed on wind turbines in a wind power plant, predict wind turbine downtime, and so on. The forecasting tools can, for example, generate forecasts on a per-operator basis. Using the per-operator forecasts, the applications hosted by data analysis system 114 in data hub $110_3$ can identify performance differences and operational parameter differences between wind power plants operated by different operators. Based on the identified differences, data analysis system 114 can recommend changes to operational parameters applied to turbines operated by specific operators to optimize power generation, maintenance scheduling, and other performance parameters in the wind power plant.

Operator control center 140, as illustrated, is connected to action queue 120 in a regional zone 104 (e.g., a customer management zone that analyzes data gathered from wind power plants operated by a common operator) and allows a wind power plant operator to view recommended actions to perform with respect to one or more wind turbines operated by a wind power plant operator. Operator control center 140 can retrieve a list of recommended actions from action queue 120 and display information about each recommended action to an operator. The information about each recommended action may include, for example, information about models of wind turbines (or specific wind turbines) for which the action is recommended, the actions to be performed, and information about why the action was recommended.

An operator can choose to implement the recommended action, and in response, operator control center 140 transmits an indication to action queue 120 to to push instructions to implement the recommended actions to one or more wind turbines in wind power plants operated by the operator. If an operator declines to implement the recommended action, operator control center 140 can transmit instructions to action queue 120 to remove the recommended action from the action queue or move the recommended action to an archive of recommended actions. In some cases, operator control center 140 can additionally provide an interface that allows a wind power plant operator to view archived actions and subsequently choose to implement an archived action.

Figure 2:
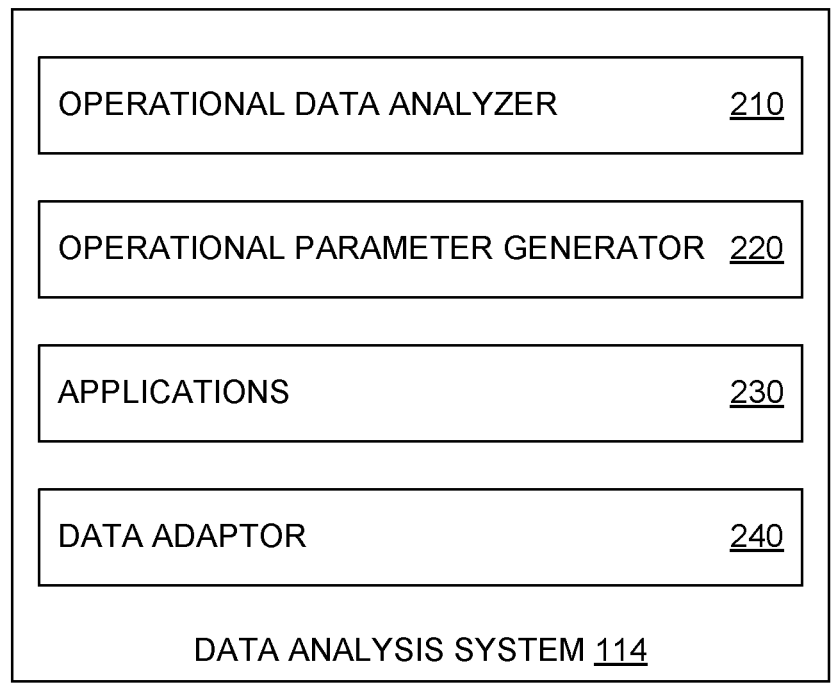
FIG. 2 illustrates an example data analysis system for obtaining and analyzing wind turbine data from a plurality of wind power plants, according to an embodiment of the present disclosure.

FIG. 2 illustrates an example data analysis system 114, according to an embodiment. As illustrated, data analysis system 114 includes an operational data analyzer 210, operational parameter generator 220, analysis applications 230, and a data adaptor 240.

Operational data analyzer 210 generally receives operational data, such as wind turbine sensor data, estimated power generation data, and so on, and environmental information (e.g., wind speed, weather, and so on), from one or more wind power plants for analysis. The amount of data operational data analyzer 210 receives for analysis may vary based on where data analysis system 114 is implemented. For example, a data analysis system 114 in data hub $110_1$ located in a power plant zone 102 may receive data from wind turbines in the wind power plant covered by the power plant zone. Data analysis systems 114 in data hubs deployed in regional (or operator-specific) zones 104 may receive data from wind turbines in multiple wind power plants operated by a specific operator. Data analysis systems 114 in data hubs deployed in central zones 106 may receive data from wind turbines in multiple wind power plants operated by a variety of power plant operators.

Using the data obtained from the one or more wind turbines (e.g., data forwarded from a data hub $110_1$ in power plant zone 102 and/or data forwarded from a data hub $110_2$ in regional zone 104), operational data analyzer 210 can identify, for example, operational trends for each wind turbine (and/or each type of wind turbine) installed at one or more wind power plants. The operational trends can indicate, for example, changes in power generation during time periods with similar weather conditions and wind speeds, trends related to component operating temperatures, and so on. In some cases, where operational data analyzer 210 receives information about alerts generated at one or more wind turbines, operational data analyzer 210 can use information about an alert generation frequency and/or alert criticality to determine trends in a wind power plant that indicate when maintenance and/or component replacement may be needed.

Operational parameter generator 220 uses the operational trends generated by operational data analyzer 210 to identify adjustments to perform to one or more wind turbine operating parameters. Operational parameter generator 220 may identify adjustments to wind turbine operating parameters on, for example, a per-wind-turbine basis or on a per-model basis. If data analysis system 114 is deployed in a regional zone 104, operational parameter generator 220 can identify adjustments to wind turbine operating parameters across different wind power plants (e.g., a fleet-wide adjustment) or within particular wind power plants (e.g., to improve wind turbine performance in wind power plants having lower performance (e.g., power generation relative to a target generated power) than other wind power plants). If data analysis system 114 is deployed in a central zone 106, operational parameter generator 220 can identify a "default" set of wind turbine operational parameters (e.g., on a per-model basis). In some cases, data analysis system 114 in a central zone 106 may store information about operational parameters applied to wind turbines in different wind power plants and, based on the stored information and the identified "default" set of wind turbine operational parameters, operational parameter generator 220 can generate adjustments to be performed on wind turbine operational parameters at each wind power plant that transmits data to data hub 110₃ in central zone 106.

Applications 230 deployed in data analysis system 114 include data analysis and forecasting applications that can be used, for example, to perform power generation forecasting, predict when maintenance may need to be performed on wind turbines in a wind power plant, predict wind turbine downtime, and so on. The applications 230 deployed in data analysis system 114 may be customized based on the location in which data analysis system is deployed. For example, forecasting applications may be deployed in data analysis systems 114 located in a power plant zone or regional zone (or operator-specific zone) to allow wind power plant operators to predict shortfalls or excess power generation capacity at one or more wind power plants. Predictive analytics applications, which can analyze operational data to identify, for example, equipment failure, required maintenance, and so on, may be hosted in data analysis systems 114 located in a power plant zone 102 or regional zone 104 to allow wind power plant operators to predict and plan for maintenance and outage events. Meanwhile, predictive analytics applications may be deployed in a data analysis system 114 located in a central zone 106 to allow wind turbine manufacturers to analyze time to failure and other predictive data points, which may identify components that should be redesigned to meet or exceed component longevity guarantees. In some cases, other predictive analytics applications may be deployed in a data analysis system 114 located in a central zone 106 to allow wind turbine manufacturers to monitor power generation information from a plurality of wind turbines and use the monitored data to identify, for example, if wind turbine components should be redesigned to meet or exceed power generation targets for different wind turbines.

Data adaptor 240 generally allows for data analysis and recommendations to be communicated between wind power plant operators and wind turbine manufacturers. As discussed above, data analysis and recommendations for service and operational changes may be generated by operational parameter generator 220 and/or other applications 230 deployed in data hub 110₃ located in a central zone 106 and transferred to action queues 120 in regional zone 104 via data adaptor 240. In some cases, data adaptor 240 can provide an interface to a satellite transceiver, wired network connection, or other network interfaces to transmit operational data recommendations to action queues 120 in regional zone 104.

Figure 3:
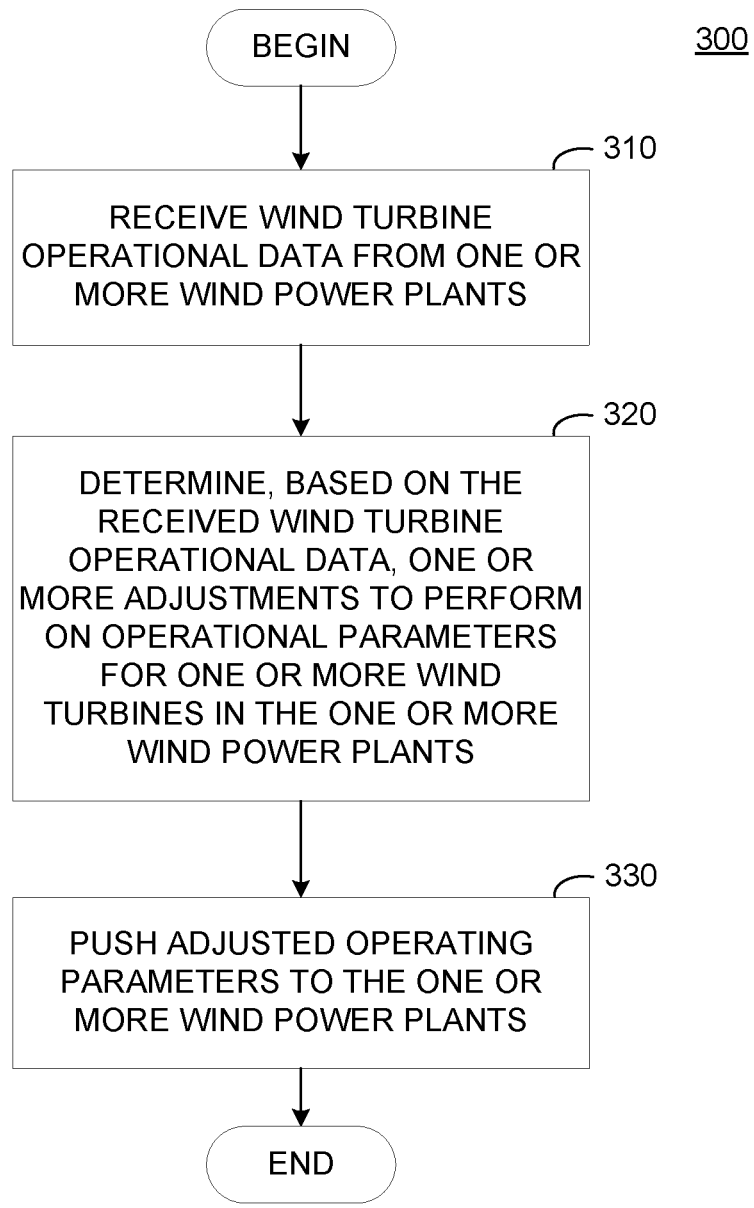
FIG. 3 illustrates example operations that may be performed by a data analysis system to apply operational parameter adjustments to wind turbines installed in one or more wind power plants, according to an embodiment of the present disclosure.

FIG. 3 illustrates example operations that may be performed by a data hub 110 to generate adjustments to wind turbine operational parameters for one or more wind turbines in a wind power plant, according to an embodiment. As illustrated, operations 300 begin at step 310, where data hub 110 receives wind turbine operational data from one or more wind power plants. As discussed herein, a data hub 110 installed in a power plant zone can request sensor data from one or more wind turbines in a wind power plant according to a schedule defined for each type of sensor installed in the wind turbines. For data hubs 110 installed in a regional zone 104 or a central zone 106, data hubs 110 can receive wind turbine operational data asynchronously. As discussed above, a data hub 110 installed in a regional zone 104 can receive data pushed from a data hub 110 installed in a power plant zone 102 and can, in turn, push the received data to a data hub 110 installed in a central zone 106.

At step 320, data hub 110 determines, based on the received wind turbine operational data, one or more adjustments to perform on operational parameters for one or more turbines in the one or more wind power plants. The one or more adjustments may be determined, for example, on a per-wind-turbine basis or on a per-model basis. Operational parameter adjustments to be performed on a per-turbine basis may be generated by data hubs 110 installed in a power plant zone 102 or a regional (operator-specific) zone 104, while per-model operational parameter adjustments may be generated by data hubs installed in a power plant zone 102, regional zone 104, or central zone 106.

At step 330, data hub 110 pushes the adjusted operational parameters to the one or more wind power plants for application to one or more wind turbines. In some cases, where data hub 110 is installed in a power plant zone 102, operational parameter adjustments may be pushed to one or more wind turbines an applied automatically (e.g., without needing an operator to review and determine whether to apply the adjustments). Meanwhile, adjustments to operational parameters generated by a data hub 110 installed in a regional zone 104 or a central zone 106 may be pushed to a power plant zone 102 for application to identified wind turbines in a wind power plant.

Figure 4:
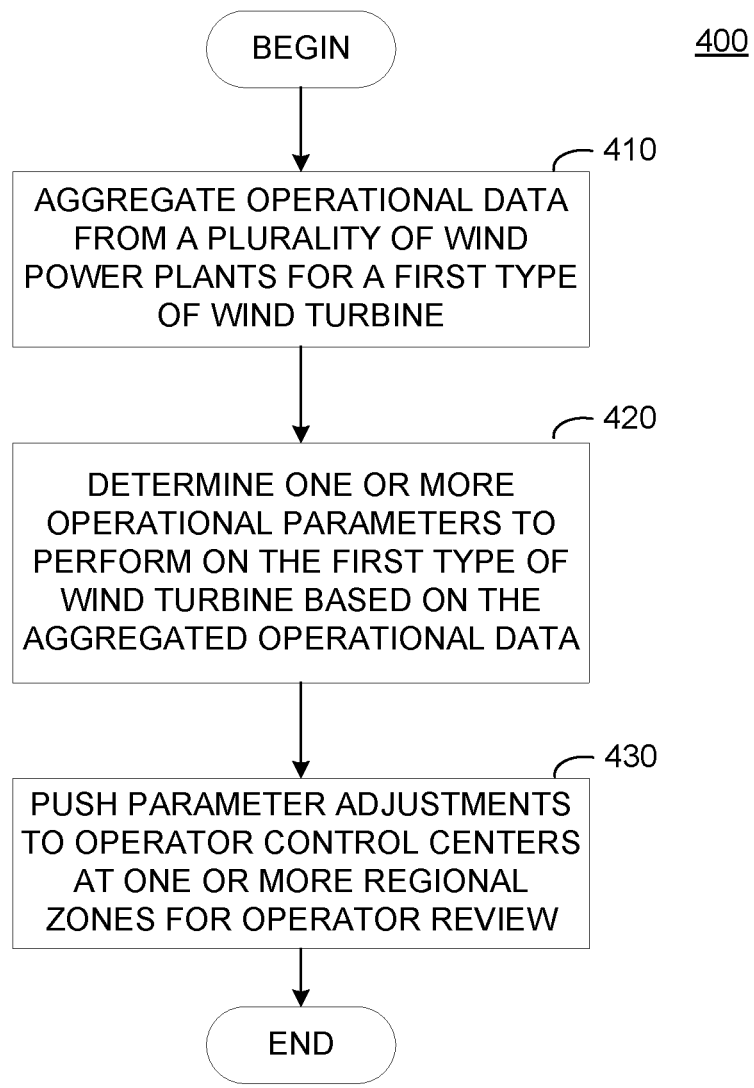
FIG. 4 illustrates example operations that may be performed by a data analysis system to recommend operational parameter adjustments to wind turbines installed in one or more wind power plants and provide the recommended adjustments to a customer for approval, according to an embodiment of the present disclosure.

FIG. 4 illustrates example operations for generating recommended adjustments to wind turbine operational parameters, according to an embodiment. As illustrated, operations 400 begin at step 410, where a data hub 110 aggregates operational data from a plurality of wind power plants for a first type of wind turbine. A data hub 110₂ in a regional zone 104 can aggregate data from a plurality of wind power plants operated by a common operator, while a data hub 110₃ in a central zone 106 can aggregate data from wind power plants operated by different operators.

At step 420, data hub 110 determines one or more operational parameter adjustments to perform on the first type of wind turbine. As discussed above, data analysis applications deployed on data hub 110 can examine the data received from one or more wind power plants to identify, for example, performance trends for wind turbines in different wind power plants and identify outliers in the performance trends. For example, a data hub 110 can determine that performance trends for a first type of wind turbine deviate from trends common to other types of wind turbines (e.g., that average power generation for a first type of wind turbine does not scale with weather and/or wind speed in a similar manner to average power generation for other types of wind turbines). Based on differences in the identified performance trends and information about operational parameters applied to wind turbines in different wind power plants, data hub 110 can identify an "optimal" set of wind turbine operational parameters and adjustments to the operational parameters applied to the first type of wind turbine based on the "optimal" set of parameters.

At step 430, data hub 110 pushes the parameter adjustments to operator control centers at each of the plurality of regional zones (or operator-specific zones) for operator review. As discussed above, information about the determined parameter adjustments may be pushed to an action queue that an operator control center can connect to. Through the operator control center, an operator can view the recommended adjustments to perform on one or more wind turbines in a wind power plant and determine whether to perform the identified adjustments on the specified wind turbines (e.g., specific wind turbines or specific models of wind turbines).

Figure 5:
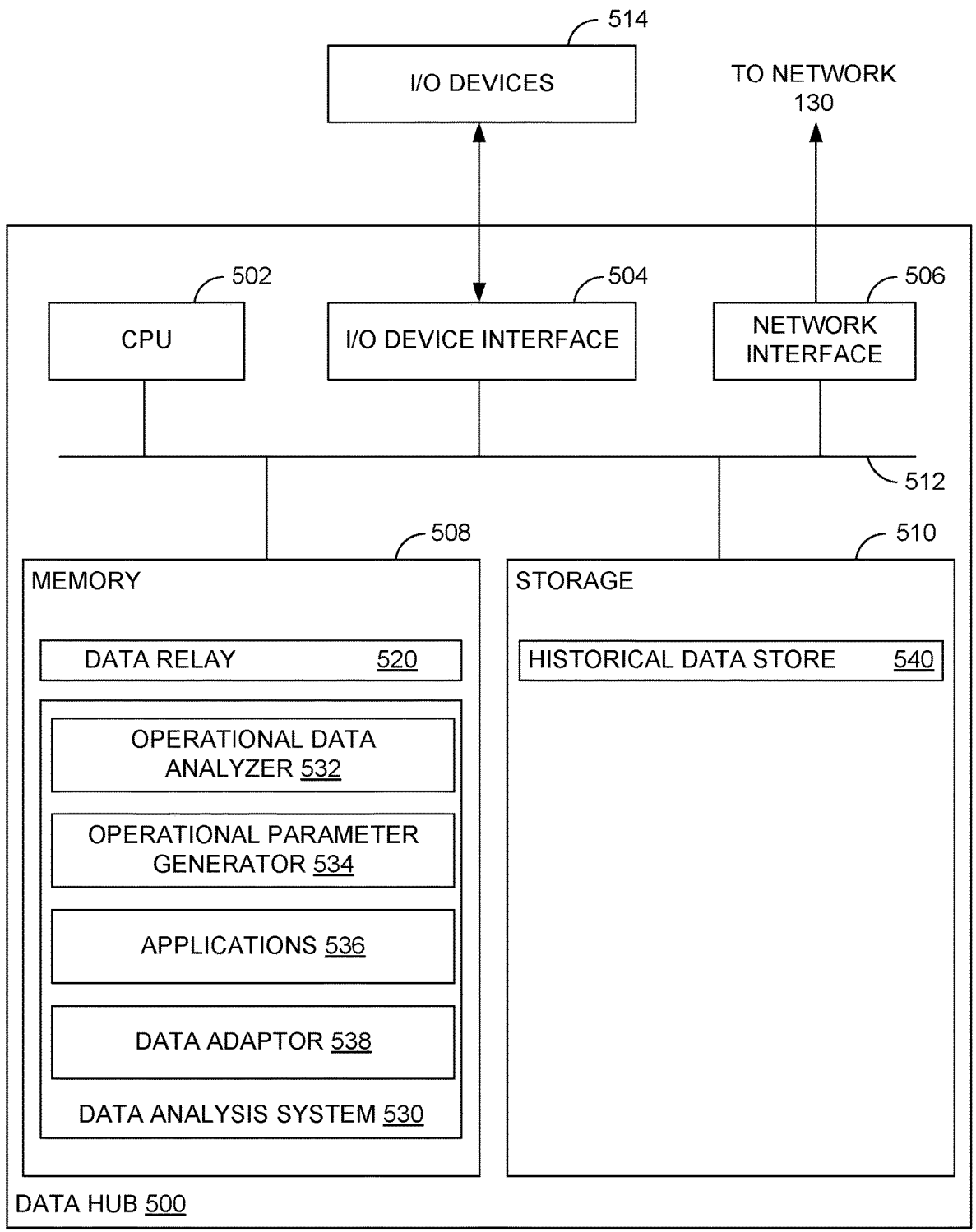
FIG. 5 illustrates an example data analysis system for wind turbine data, according to an embodiment of the present disclosure.

FIG. 5 illustrates an example data hub 500 that receives data from one or more wind turbines, forwards the received data to a data hub in a different management zone, and analyzes the received data to generate operational parameter adjustments to be performed on one or more wind turbines, according to an embodiment. As shown, the data hub 500 includes, without limitation, a central processing unit (CPU) 502, one or more I/O device interfaces 504 which may allow for the connection of various I/O devices 514 to the data hub 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 506 is included to be representative of a random access memory. Furthermore, the storage 510 may be a disk drive. Although shown as a single unit, the storage 510 may be a combination of fixed and/or removable storage devices, such as fixed disc drives, fixed solid state drives, removable memory cards or optical storage, network attached storage (NAS), or a storage area-network (SAN). In some cases, a number fixed storage devices may be combined into a logical storage device to provide fault tolerance for storage 510.

As shown, memory 508 includes a data relay 520 and a data analysis system 530. Data relay 520 and data analysis system 530 may execute directly on data hub 500 or in a virtual machine hosted by a hypervisor executing on a computer system. As discussed, data relay 520 generally obtains data from one or more wind turbines and forwards the data to other data hubs in regional zones 104 and/or central zones 106. For a data relay 520 in a data hub 500 deployed in a power plant zone 102, data relay 520 can periodically request or asynchronously receive sensor data and other operational data from one or more wind turbines or other external sources and forward the received data to a data hub 500 deployed in a regional zone 104. A data hub 500 deployed in a regional zone 104 can asynchronously receive wind turbine operational data from one or more wind power plants and forward the data to a data hub deployed in a central zone 106.

Data analysis system 530, as illustrated, generally includes an operational data analyzer 532, operational parameter generator 534, applications 536, and data adaptor 538. Operational data analyzer 532 receives wind turbine operational data from one or more wind power plants through data relay 520 for analysis. The analysis may include, for example, identifying operational trends for each wind turbine and/or each model of wind turbine installed at one or more wind power plants. In some cases, the operational trends can indicate changes in power generated at different wind power plants during periods of similar weather conditions and wind speeds, trends in component operating temperatures, and so on.

Operational parameter generator 534 uses the operational data trends analyzed by operational data analyzer 532 and other wind turbine data to identify adjustments to perform to one or more wind turbine operating parameters. Operational parameter generator 534 may, as discussed above, identify adjustments to wind turbine operating parameters on a per-turbine basis or a per-turbine model basis and on a per-wind-farm, per-operator, or worldwide basis. The operational parameter adjustments may be established, for example, to optimize performance relative to a baseline (or expected) performance model. In some cases, operational parameter generator 534 can identify one or more wind power plants to use as a "model" or "target" power plant and can identify adjustments to perform to wind turbine operational parameters at other power plants based on differences between operational parameters established at the "model" power plant and the other power plants.

Applications 536 deployed in data analysis system 530 generally include data analysis and forecasting applications that can be customized for each operator or zone in which a data hub is deployed, according to embodiments. The applications 536 may, for example, include forecasting applications that predict power generation, maintenance intervals, turbine downtime, and so on.

Data adaptor 538 provides an interface for data hub 500 to transmit and receive data analysis and operational parameter recommendations between wind power plant operators and wind turbine manufacturers. Data adaptor 538 may include authentication and connection routines to establish connections with customer systems (e.g., operator control center 140) through one or more network interfaces 506 (e.g., satellite transceivers, wired network connections, and so on).

As shown, storage 510 includes a historical data repository 540. Historical data repository 540 generally provides a location in which data hub 500 can store wind turbine operational data obtained from one or more wind turbines for use in future data analysis and operational parameter adjustments, as discussed herein. In some cases, historical data repository may be a database in which sensor data is stored and associated with source information. The source information saved in historical data repository may vary based on a location in which data hub 500 is deployed. For example, if data hub 500 is deployed in a power plant zone 102, the source information may identify a specific wind turbine. If data hub 500 is deployed in a regional zone, the source information may identify a specific wind power plant and wind turbine. Meanwhile, if data hub 500 is deployed in a global zone, the source information may identify a wind turbine operator, a specific wind power plant, and a specific wind turbine.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method for processing wind turbine data in a distributed data analysis system, comprising:
   obtaining, at a first data analysis system, operational data from a plurality of wind turbines in a first wind power plant;
   determining a first adjustment to perform to an operational parameter of a wind turbine of the plurality of wind turbines based on the operational data;
   pushing the first adjustment to the first wind power plant;
   transmitting the operational data to a second data analysis system, wherein the first data analysis system is located at the first wind power plant and the second data analysis system comprises a regional data analysis system not located at the first wind power plant;
   transmitting the operational data from the first wind power plant and operational data from a second wind power plant to a third data analysis system, wherein the third data analysis system comprises a global data analysis system;
   at the third data analysis system, determining a second adjustment to perform to an operational parameter of one or more wind turbines; and
   pushing the second adjustment to the second data analysis system.

2. The method of claim 1, further comprising:
   transmitting the second adjustment to an operator control center; and
   upon receiving approval to apply the second adjustment to wind turbines in one or more wind power plants, pushing the second adjustment from the second data analysis system to the first wind power plant.

3. The method of claim 1, wherein determining the first adjustment comprises determining one or more adjustments to perform for each type of wind turbine in the first wind power plant.

4. The method of claim 1, wherein pushing the first adjustment to the first wind power plant comprises pushing the first adjustment to the plurality of wind turbines in the first wind power plant.

5. The method of claim 1, wherein pushing the first adjustment to the first wind power plant comprises pushing the first adjustment to a management system at the first wind power plant for approval by a wind power plant manager.

6. The method of claim 1, wherein obtaining the operational data from the plurality of wind turbines in the first wind power plant comprises periodically requesting data from the one or more wind turbines.

7. The method of claim 1, wherein transmitting the operational data to the second data analysis system comprises asynchronously transmitting the operational data to the second data analysis system.

8. A system, comprising:
   a processor; and
   a memory comprising instructions which, when executed by the processor, performs an operation for processing wind turbine data in a distributed data analysis system, the operation comprising:
      obtaining, at a first data analysis system, operational data from a plurality of wind turbines in a first wind power plant;
      determining a first adjustment to perform to an operational parameter of a wind turbine of the plurality of wind turbines based on the operational data;
      pushing the first adjustment to the first wind power plant;
      transmitting the operational data to a second data analysis system, wherein the first data analysis system is located at the first wind power plant and the second data analysis system comprises a regional data analysis system not located at the first wind power plant;

transmitting the operational data from the first wind power plant and operational data from a second wind power plant to a third data analysis system, wherein the third data analysis system comprises a global data analysis system;
at the third data analysis system, determining a second adjustment to perform to an operational parameter of one or more wind turbines; and
pushing the second adjustment to the second data analysis system.

9. The system of claim 8, wherein the operation further comprises:
transmitting the second adjustment to an operator control center; and
upon receiving approval to apply the second adjustment to wind turbines in one or more wind power plants, pushing the second adjustment from the second data analysis system to at least the first wind power plant.

10. The system of claim 8, wherein pushing the first adjustment to the first wind power plant comprises pushing the first adjustment to a management system at the first wind power plant for approval by a wind power plant manager.

11. The system of claim 8, wherein obtaining the operational data from one or more wind turbines in the first wind power plant comprises periodically requesting data from the plurality of wind turbines.

12. The system of claim 8, wherein transmitting the operational data to the second data analysis system comprises asynchronously transmitting the operational data to the second data analysis system.

13. A non-transitory computer-readable medium comprising instructions which, when executed by one or more processors, performs an operation for processing wind turbine data in a distributed data analysis system, the operation comprising:
obtaining, at a first data analysis system, operational data from a plurality of wind turbines in a first wind power plant;
determining a first adjustment to perform to an operational parameter of a wind turbine of the plurality of wind turbines based on the operational data;
pushing the first adjustment to the first wind power plant;
transmitting the operational data to a second data analysis system, wherein the first data analysis system is located at the first wind power plant and the second data analysis system comprises a regional data analysis system not located at the first wind power plant;
transmitting the operational data from the first wind power plant and operational data from a second wind power plant to a third data analysis system, wherein the third data analysis system comprises a global data analysis system;
at the third data analysis system, determining a second adjustment to perform to an operational parameter of one or more wind turbines; and
pushing the second adjustment to the second data analysis system.

14. The non-transitory computer-readable medium of claim 13, wherein the operation further comprises:
transmitting the second adjustment to an operator control center; and
upon receiving approval to apply the second adjustment to wind turbines in one or more wind power plants, pushing the second adjustment from the in the second data analysis system to the first wind power plant.

15. The non-transitory computer-readable medium of claim 13, wherein pushing the first adjustment to the first wind power plant comprises pushing the first adjustment to a management system at the first wind power plant for approval by a wind power plant manager.

16. The non-transitory computer-readable medium of claim 13, wherein obtaining the operational data from one or more wind turbines in the first wind power plant comprises periodically requesting data from the plurality of wind turbines.

17. The non-transitory computer-readable medium of claim 13, wherein transmitting the operational data to the second data analysis system comprises asynchronously transmitting the operational data to the second data analysis system.

* * * * *